(12) United States Patent
Asai et al.

(10) Patent No.: US 7,738,854 B2
(45) Date of Patent: Jun. 15, 2010

(54) EXTERNAL MEMORY MANAGEMENT APPARATUS AND EXTERNAL MEMORY MANAGEMENT METHOD

(75) Inventors: Mao Asai, Kawasaki (JP); Makoto Hamatsu, Yokohama (JP); Tomoyuki Tamachika, Yokosuka (JP); Hirohito Taniguchi, Settsu (JP)

(73) Assignee: NTT DoCoMo, Inc., Tokyo (JP)

( * ) Notice: Subject to any disclaimer, the term of this patent is extended or adjusted under 35 U.S.C. 154(b) by 504 days.

(21) Appl. No.: 11/519,884

(22) Filed: Sep. 13, 2006

(65) Prior Publication Data

US 2007/0060116 A1 Mar. 15, 2007

(30) Foreign Application Priority Data

Sep. 15, 2005 (JP) ............... P2005-268472

(51) Int. Cl.
*H04M 1/725* (2006.01)
*H04M 3/00* (2006.01)
*H04B 1/38* (2006.01)

(52) U.S. Cl. .............. 455/403; 455/412.1; 455/419; 455/558

(58) Field of Classification Search ............ 455/412.1, 455/418–420, 514, 557–558
See application file for complete search history.

(56) References Cited

U.S. PATENT DOCUMENTS

| | | | |
|---|---|---|---|
| 6,327,658 B1 | 12/2001 | Susaki et al. | |
| 6,671,522 B1 * | 12/2003 | Beaudou | 455/558 |
| 6,944,478 B1 | 9/2005 | Durand | |
| 7,286,852 B2 * | 10/2007 | Imura | 455/558 |
| 7,379,731 B2 * | 5/2008 | Natsuno et al. | 455/412.1 |
| 2003/0236867 A1 | 12/2003 | Natsuno et al. | |
| 2004/0006713 A1 | 1/2004 | Minemura | |

(Continued)

FOREIGN PATENT DOCUMENTS

CN 1465006 A 12/2003

(Continued)

OTHER PUBLICATIONS

A. Menezes, et al., "Handbook of Applied Cryptography" CRC Press Series on Discrete Mathematics and its Applications, XP002431402, 1997, pp. 386-390, 400-405.

(Continued)

*Primary Examiner*—Simon D Nguyen
(74) *Attorney, Agent, or Firm*—Oblon, Spivak, McClelland, Maier & Neustadt, L.L.P.

(57) ABSTRACT

An objective is to prevent an unauthorized application from falsifying and assuming specific information generated for access to an external memory, without permission, and to achieve safer management of access to the external memory. An external memory function module 15 is a function module to control access of applications 101A and 101B downloaded in a cell phone 1, to an external memory 2. This external memory function module 15 has an identifier acquirer 151 for acquiring an identifier from each of the applications 101A and 101B, a generator 153 for generating specific information to specify the application, based on identification information designated by the identifier acquired, a reserving section 154 for reserving a predetermined area of the external memory 2 as a directory for the application, and a writing section 155 for writing the specific information generated, in an attribute file of the external memory 2.

12 Claims, 8 Drawing Sheets

U.S. PATENT DOCUMENTS

| | | | | |
|---|---|---|---|---|
| 2004/0209651 | A1* | 10/2004 | Tsukamoto | 455/558 |
| 2004/0235523 | A1* | 11/2004 | Schrire et al. | 455/558 |
| 2005/0287987 | A1* | 12/2005 | Yamamoto | 455/410 |
| 2006/0136548 | A1* | 6/2006 | Nishio et al. | 709/203 |

FOREIGN PATENT DOCUMENTS

| | | |
|---|---|---|
| CN | 1480862 A | 3/2004 |
| EP | 1 089 156 A2 | 4/2001 |
| EP | 1 383 351 A2 | 1/2004 |
| FR | 2 795 583 A1 | 12/2000 |
| JP | 11-143840 | 5/1999 |
| JP | 2001-229018 | 8/2001 |
| JP | 2004-40717 | 2/2004 |
| JP | 2004-46307 | 2/2004 |
| JP | 2004-302995 | 10/2004 |
| JP | 2005-129063US | 5/2005 |

OTHER PUBLICATIONS

"i-appli Contents Development Guide for DoJa-3.0 i-appli Option and i-appli Enlarged Edition", NTT DOCOMO, Inc., 3.2 Edition, URL, http://www.nttdocomo.co.jp/service/imode/make/content/iappli/technical_data/doja/doja30_opt/index.html, Jul. 9, 2004, pp. 1-56 (with English translation).

Kenichi Kanbara, "J2ME for Business J2ME CLDC Business Programming", Java Press vol. 38, Gijutsu-Hyoron, Co., Ltd., vol. 38, pp. 212-222 (with English translation).

* cited by examiner

| IDENTIFIER | IDENTIFICATION INFORMATION ABOUT APPLICATION A |
|---|---|
| AP-ID | www.aplication-a.com/download.html |
| CP-ID | Corp. AAA |
| : | : |

*Fig.3*

| IDENTIFIER | IDENTIFICATION INFORMATION ABOUT CELL PHONE |
|---|---|
| MODEL ID | MOBILE101 |
| SERIES ID | 1234 |
| UIM-ID | UIM-MOBILE101-1234 |
| : | : |

EXTERNAL MEMORY MANAGEMENT APPARATUS AND EXTERNAL MEMORY MANAGEMENT METHOD

BACKGROUND OF THE INVENTION

1. Field of the Invention

The present invention relates to an external memory management apparatus and external memory management method for controlling access of an application downloaded in a wireless communication terminal, to a removable external memory.

2. Related Background Art

As wireless communication terminals, e.g., cell phones increase diversity of their functionality in recent years, a required storage capacity is also increasing in order to implement the diversity of multiple functions. On the other hand, the wireless communication terminals are also being downsized, and there are thus cases where the whole required storage capacity cannot be located inside the wireless communication terminal. For this reason, for example, an external memory device has been and is being used in order to accept the increased storage capacity.

In use of such an external memory device, it is necessary to ensure security of data stored in the memory device and to implement such control that the data stored in the external memory device is available for a registered cell phone only, for example, as in the technology described in Patent Document 1 below. This Patent Document 1 describes that it is determined whether a key held by the cell phone coincides with a key held by the memory device and that use of the data stored in the specific memory device is limited to only the specific cell phone.

[Patent Document 1] Japanese Patent Application Laid-Open No. 2004-40717

SUMMARY OF THE INVENTION

Incidentally, the Internet-related functionality of wireless communication terminals is also becoming diversified in recent years, and applications used therein are also being diversified. In general, such applications are downloaded via the Internet from an unspecified large number of distributors. In a situation where a number of applications from different distributors are downloaded and used in a wireless communication terminal, it is also contemplated that an external memory device or the like is used in order to secure a storage capacity necessary for storage of data handled by the applications.

In such a situation, it is often the case that an identical external memory device is used among different types of applications downloaded from different creators, in view of simplicity of implementation and convenience of use. At this time, it is undesirable to unconditionally permit the different types of applications downloaded, to access the same external memory, from the aspect of safety management of the data stored in the external memory.

It is thus necessary to implement safe management of access to the external memory device, for example, based on matching of encrypted keys or the like, so as to restrict access to the memory to only specific authorized applications. However, the encrypted keys or the like might be falsified and assumed by another unauthorized application and in that case there arises a problem of failure in restriction on the access.

The present invention has been accomplished in view of the above circumstances and an object of the invention is to provide an external memory management apparatus and external memory management method capable of preventing an unauthorized application from assuming an encrypted key for access to an external memory and achieving safer management of the access to the external memory.

In order to solve the above problem, an external memory management apparatus according to the present invention is an external memory management apparatus for controlling access of an application downloaded in a wireless communication terminal, to a removable external memory, comprising: acquiring means for acquiring an identifier from the application downloaded; generating means for generating specific information to specify the application, based on identification information designated by the identifier acquired by the acquiring means; reserving means for reserving a predetermined area of the external memory as a storage area available for the application; and writing means for writing the specific information generated by the generating means, in attribute information of the storage area reserved by the reserving means.

An external memory management method according to the present invention is an external memory management method of controlling access of an application downloaded in a wireless communication terminal, to a removable external memory, comprising: an acquiring step wherein acquiring means acquires an identifier from the application downloaded; a generating step wherein generating means generates specific information to specify the application, based on identification information designated by the identifier acquired in the acquiring step; a reserving step wherein reserving means reserves a predetermined area of the external memory as a storage area available for the application; and a writing step wherein writing means writes the specific information generated in the generating step, in attribute information of the storage area reserved in the reserving step.

The external memory management apparatus and external memory management method according to the present invention are arranged to acquire only an identifier, i.e., only a type of relevant identification information from an application downloaded in the wireless communication terminal. Then the generating means generates the specific information peculiar to the application, based on the identification information designated by this identifier. When the specific information peculiar to the application is not generated by the application, but generated by the generating means in the present invention as described above, it becomes feasible, for example, to prevent another application not sharing data with the application of interest, from falsifying and assuming this specific information without permission.

After the reserving means reserves the storage area for the application in the external memory, the writing means writes the specific information in the attribute information of the storage area reserved. Therefore, this enables the information restricted to the application only to be written in the attribute information of the reserved storage area, whereby use of the storage area with the attribute information can be limited to the application only.

In the external memory management apparatus of the present invention, preferably, the acquiring means acquires from the application an application identifier to identify the application, and a wireless communication terminal identifier to identify the wireless communication terminal, and the generating means generates specific information to specify the application and the wireless communication terminal, based on application identification information designated by the application identifier and based on wireless communication terminal identification information designated by the wireless communication terminal identifier.

According to the present invention, the external memory management apparatus uses the application identification information and the wireless communication terminal identification information as the identification information being a basis for generation of the specific information. For this reason, the writing means becomes able to write the specific information limited to the application and the wireless communication terminal only, in the attribute file in the external memory. Therefore, use of the storage area specified by the specific information can be limited to the application and the wireless communication terminal only.

The present invention prevents an unauthorized application from falsifying and assuming the specific information generated for access to the external memory, without permission, and enables safer management of access to the external memory.

DESCRIPTION OF THE PREFERRED EMBODIMENTS

The present invention can be readily understood in view of the following detailed description with reference to the accompanying drawings presented by way of illustration only. Subsequently, embodiments of the present invention will be described with reference to the accompanying drawings. An embodiment of the present invention will be described below using an example of a situation where the external memory management apparatus of the present invention is mounted and used as an external memory function module in a cell phone as a wireless communication terminal. This external memory function module operates as a function module to control access of an application downloaded in a cell phone, to a removable external memory. The same portions will be denoted by the same reference symbols as much as possible, without redundant description.

Figure 1:
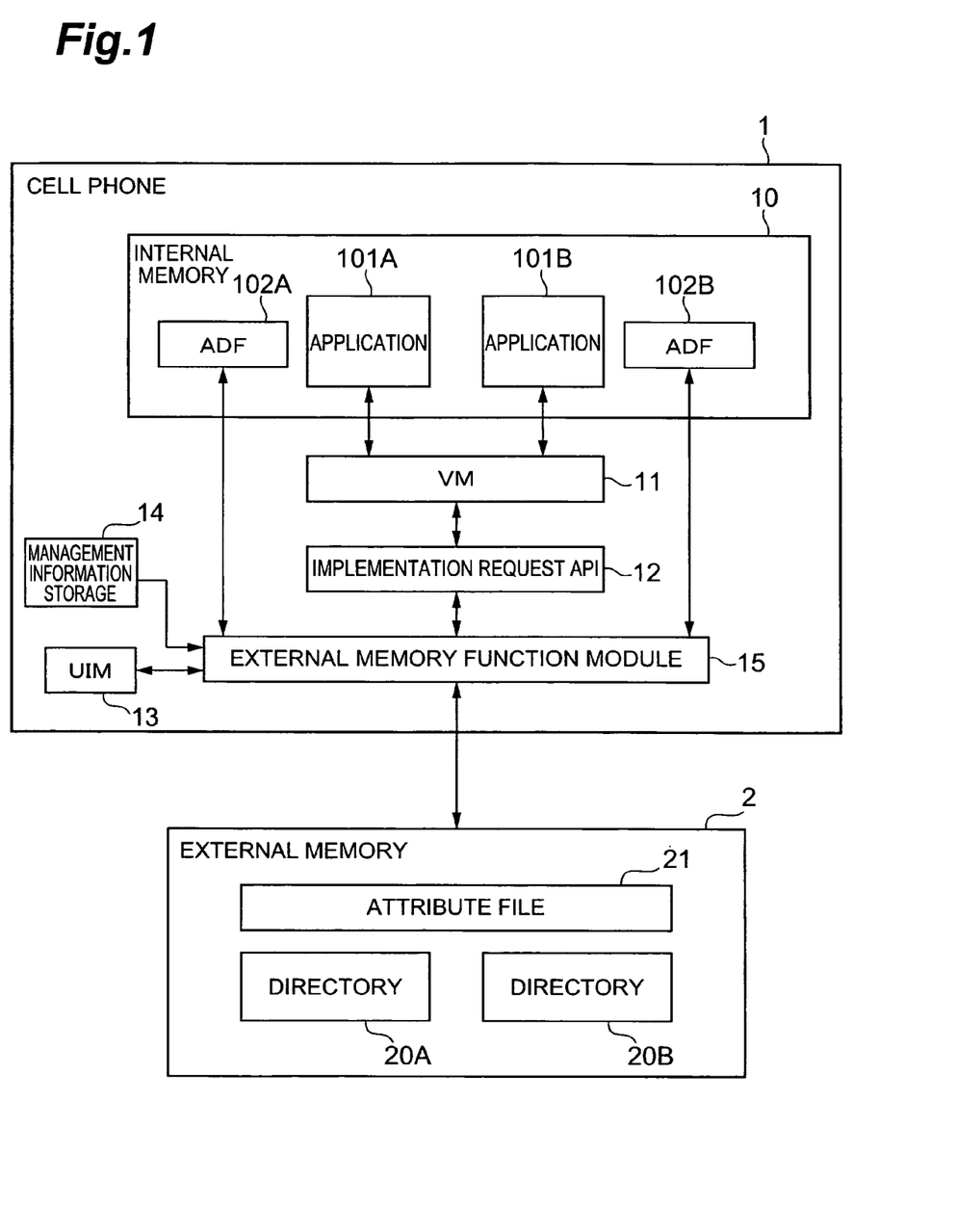
FIG. 1 is a schematic diagram to illustrate a configuration of cell phone 1 incorporating external memory function module 15 according to an embodiment of the present invention.

First, a configuration of cell phone 1 in which the external memory function module 15 according to the embodiment of the present invention is mounted, will be described with reference to FIG. 1. FIG. 1 is a schematic diagram of the configuration of cell phone 1. As shown in FIG. 1, the cell phone 1 is composed of internal memory 10, VM 11 (Virtual Machine), implementation request API (Application Program Interface) 12, UIM 13 (User Identity Module), management information storage 14, and external memory function module 15. Each of the components of the cell phone 1 will be described below in detail.

Stored in the internal memory 10 are applications 101A and 101B, and ADFs (Attribute Definition Files) 102A and 102B corresponding to the applications 101A and 101B. This internal memory 10 is configured to be able to transmit and receive information to and from the external memory function module 15.

The applications 101A and 101B stored in the internal memory 10 are applications that were downloaded via the Internet from an unspecified large number of contents providers, for example, by a downloading means (not shown) of cell phone 1 and that are stored in an operable state in cell phone 1. Namely, the applications downloaded are supplied from different distributors and data handled by each application is not shared, for example, between application 101A and application 101B. These applications 101A and 101B are implemented so as to operate on VM 11 and implementation request API 12. VM 11 is software, for example, that performs transformation of formats so that the applications 101A and 101B are workable on an OS (Operating System) of cell phone 1. API 12 is so-called middleware that provides functionality of common use among applications.

ADFs 102A and 102B contain data about attributes of the applications 101A and 101B. Specifically, each of the ADFs 102A and 102B contains a record of an AP-ID for identification of the application, a CP-ID for identification of a contents provider having produced and distributed the application, and so on.

Figure 2:
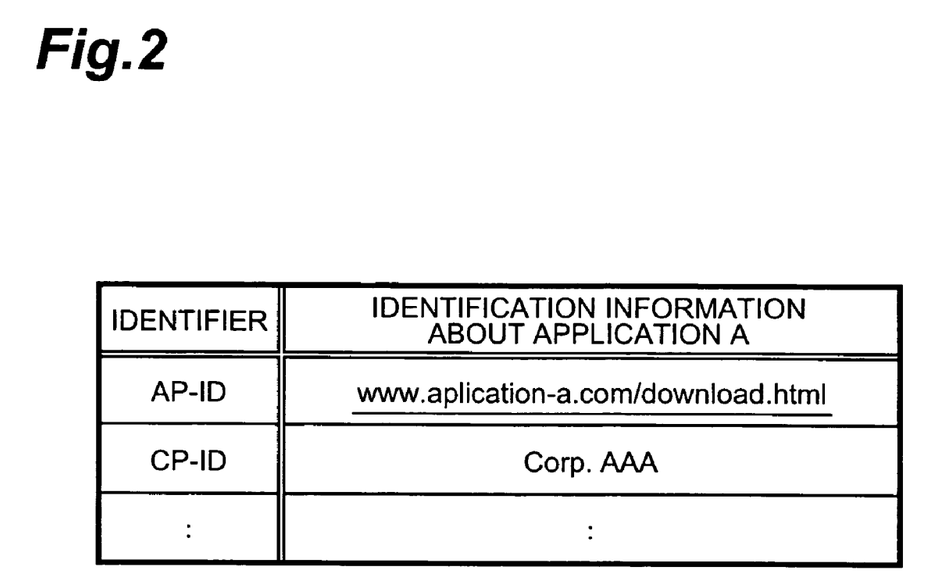
FIG. 2 is a drawing to illustrate an example of data stored in ADF 102A.

FIG. 2 shows an example of data recorded in the ADF 102A. As shown in FIG. 2, the AP-ID is identification information for the application 101A, for example, a URL (e.g., "www.aplication-a.com/download.html") of a download source of the application 101A, in the form of digitized data of the URL according to a predetermined arithmetic. The CP-ID is identification information for the contents provider, e.g., a name of the contents provider having produced and distributed the application 101A (e.g., "Corp. AAA"), in the form of digitized data of the name according to a predetermined arithmetic. The above-described AP-ID and CP-ID as names of types of information correspond to the application identifier in the present invention. Furthermore, "www.aplication-a.com/download.html" and "Corp. AAA" as actual contents of information designated by the application identifier correspond to the application identification information in the present invention.

Figure 3:
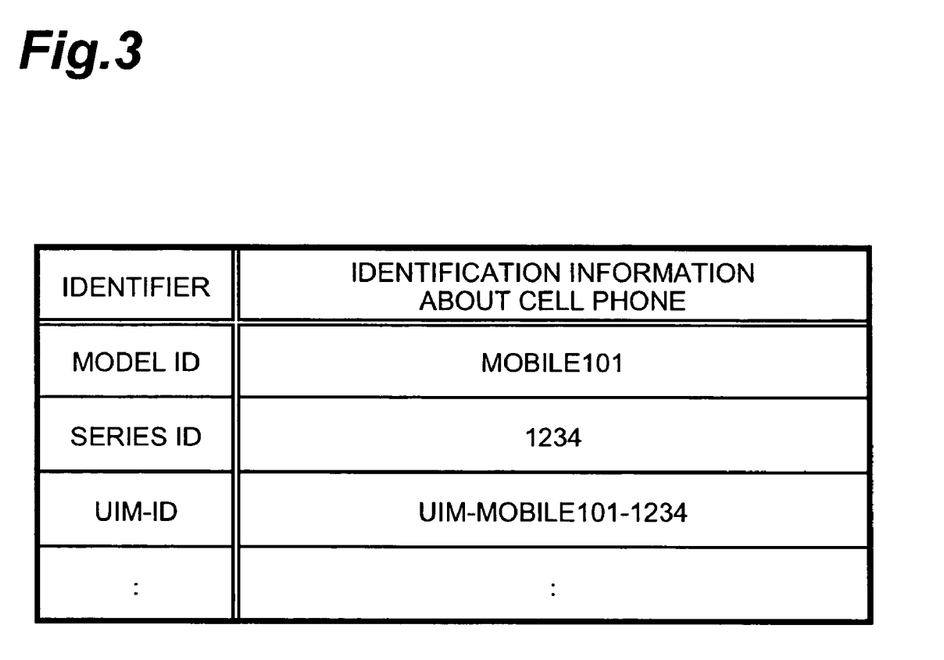
FIG. 3 is a drawing to illustrate an example of data stored in UIM 13 or in management information storage 14.

The UIM 13 is constructed, for example, of an IC card and is removably mounted in a card slot (not shown) of cell phone 1. The management information storage 14 is, for example, a storage device in cell phone 1 and is constructed, for example, of a ROM (Read Only Memory). Stored in the UIM 13 or in the management information storage 14 is data about attributes of the cell phone 1 such as subscriber information. FIG. 3 shows an example of data stored in UIM 13 or in management information storage 14. As shown in FIG. 3, the UIM 13 or management information storage 14 stores digital data such as a model ID ("MOBILE101") indicating a model of the cell phone 1, a series ID ("1234") indicating a series number of the cell phone 1, a UIM-ID ("UIM-MOBILE101-1234") for identification of UIM 13, and so on. The UIM 13 and management information storage 14 are implemented so as to be able to transmit and receive information to and from the external memory function module 15. The above-described model ID, series ID, UIM-ID, and so on as names of types of information correspond to the wireless communication terminal identifier in the present invention. Furthermore, "MOBILE101," "1234," "UIM-MOBILE101-1234," and so on as actual contents of information designated by the wireless communication terminal identifier correspond to the wireless communication terminal identification information in the present invention.

Figure 4:
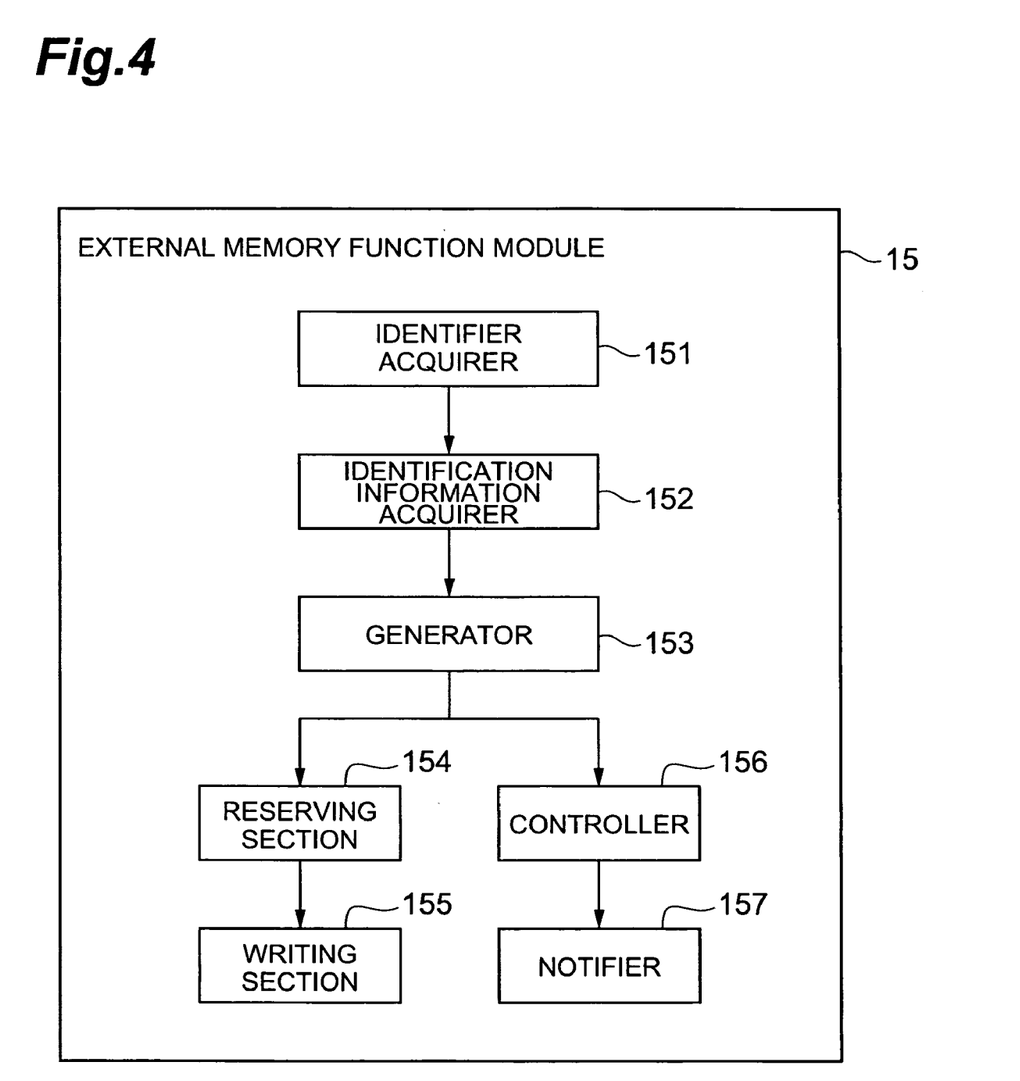
FIG. 4 is a schematic diagram to illustrate a configuration of external memory function module 15 in FIG. 1.

Returning to FIG. 1, the external memory function module 15 is a function module that controls access of the downloaded applications 101A and 101B to the removable external memory 2. FIG. 4 is a schematic diagram of a configuration of this external memory function module 15. As shown in FIG. 4, the external memory function module 15 is composed of identifier acquirer (acquiring means) 151, identification information acquirer 152, generator (generating means) 153, reserving section (reserving means) 154, writing section (writing means) 155, controller 156, and notifier 157. Each of the components of the external memory function module 15 will be described below in detail.

The identifier acquirer 151 is a part that acquires an identifier such as an application identifier or a wireless communication terminal identifier designated by the applications 101A and 101B. Namely, when the applications 101A and 101B designate, for example, one or more of the AP-ID, CP-ID, model ID, series ID, and UIM-ID as an application identifier or wireless communication terminal identifier, the identifier acquirer 151 acquires the identifier designated and outputs it to the identification information acquirer 152. Which identifier is designated by the applications 101A and 101B is determined according to a predetermined rule between the applications and the external memory function module 15. In order to ensure the security, none except for the applications is informed of this rule.

The identification information acquirer 152 accepts input of the identifiers designated by the applications 101A and 101B, from the identifier acquirer 151, and acquires the identification information corresponding to the input of identifiers from the ADFs 102A and 102B, UIM 13, or management information storage 14. More specifically, for example, supposing the application 101A designates the AP-ID and CP-ID as the application identifier, the identification information acquirer 152 acquires the digital data of "www.aplication-a.com/download.html" and "Corp. AAA" recorded in the ADF 102A, as the application identification information corresponding to the AP-ID and CP-ID. In a case where the application 101A designates the model ID, series ID, and UIM-ID as the wireless communication terminal identifier, the identification information acquirer 152 acquires the digital data of "MOBILE101," "1234," and "UIM-MOBILE101-1234" stored in UIM 13 or in management information storage 14, as the wireless communication terminal identification information corresponding to the model ID, series ID, and UIM-ID. Then the identification information acquirer 152 outputs to the generator 153 the application identification information and the wireless communication terminal identification information acquired in this manner.

The generator 153 generates a bind ID (specific information) to specify the application and the cell phone 1 on which the application is mounted, based on the application identification information and the wireless communication terminal identification information fed from the identification information acquirer 152. The present embodiment adopts a well-known hash function as a generation algorithm for the bind ID used in this operation. Namely, in a case where the application identification information and the wireless communication terminal identification information supplied is "www.aplication-a.com/download.html," "Corp. AAA," "MOBILE101," "1234," and "UIM-MOBILE101-1234," the generator 153 uses the identification information as arguments of the hash function to obtain a hash value and defines the hash value as a bind ID of the application. This hash function is appropriately selected, for example, in view of a security level of the external memory management or simplicity of implementation. The generator 153 outputs the bind ID generated in this manner, to the writing section 155 and to the controller 156.

The reserving section 154 is a part that reserves a predetermined area in the external memory 2 as a directory (storage area) available for each of the applications 101A and 101B. The external memory 2 to be used in the present embodiment is, for example, a general-purpose removable memory device such as the SD memory card (Secure Digital Memory Card), SmartMedia (registered trademark), or Compact Flash (registered trademark). As shown in FIG. 1, a number of directories, e.g., directories 20A and 20B, can be made in this external memory 2, and the reserving section 154 reserves the directories thus made, as storage areas for the respective applications. In the present embodiment, the reserving section 154 reserves directory 20A as a storage area available for the application 101A, and reserves directory 20B as a storage area available for the application 101B.

The writing section 155 is a part that writes the bind ID generated by the generator 153, as a discrimination ID of each directory in an attribute file (attribute information) 21 of the external memory 2. Namely, for example, when the reserving section 154 reserves the directory 20A as a storage area available for the application 101A, the writing section 155 writes the bind ID generated by the generator 153 on the basis of the identification information corresponding to the identifier designated by the application 101A, as a discrimination ID of the directory 20A in the attribute file 21.

The controller 156 is a part that controls access of the applications 101A and 101B downloaded via the Internet from an unspecified large number of contents providers, to the directories 20A and 20B in the external memory 2. Specifically, when there arises a request for decryption of electronic data stored in the external memory 2, the controller 156 checks the bind ID generated by the generator 153, against the directory discrimination ID recorded in the attribute file 21. When the result of this check is that the directory discrimination ID coincides with the bind ID, the controller 156 performs such control as to permit access of the application to the directory. Namely, the controller 156 extracts, for example, the electronic data under the request for decryption by the application from the directory in the external memory 2 and outputs the data to the application. The external memory function module 15 further comprises decryption requested data importing means (not shown). This decryption requested data importing means is a means for importing information to specify electronic data as an object under a request for decryption, from the application and for exporting it to the controller 156.

On the other hand, when the result of the above check is that the directory discrimination ID does not coincide with the bind ID, the controller 156 performs such control as to inhibit access of the application to the directory. Namely, the controller 156 does not extract, for example, the electronic data under the request for decryption by the application from the directory in the external memory 2, and outputs information to indicate the inhibition of access of the application to the directory, to notifier 157.

The notifier 157 is a part that imports information indicating permission/inhibition of access of the application to the directory from the controller 156 and that notifies the application of the information. The application receiving the notification can determine which area it is allowed to access in the external memory 2.

Figure 5:
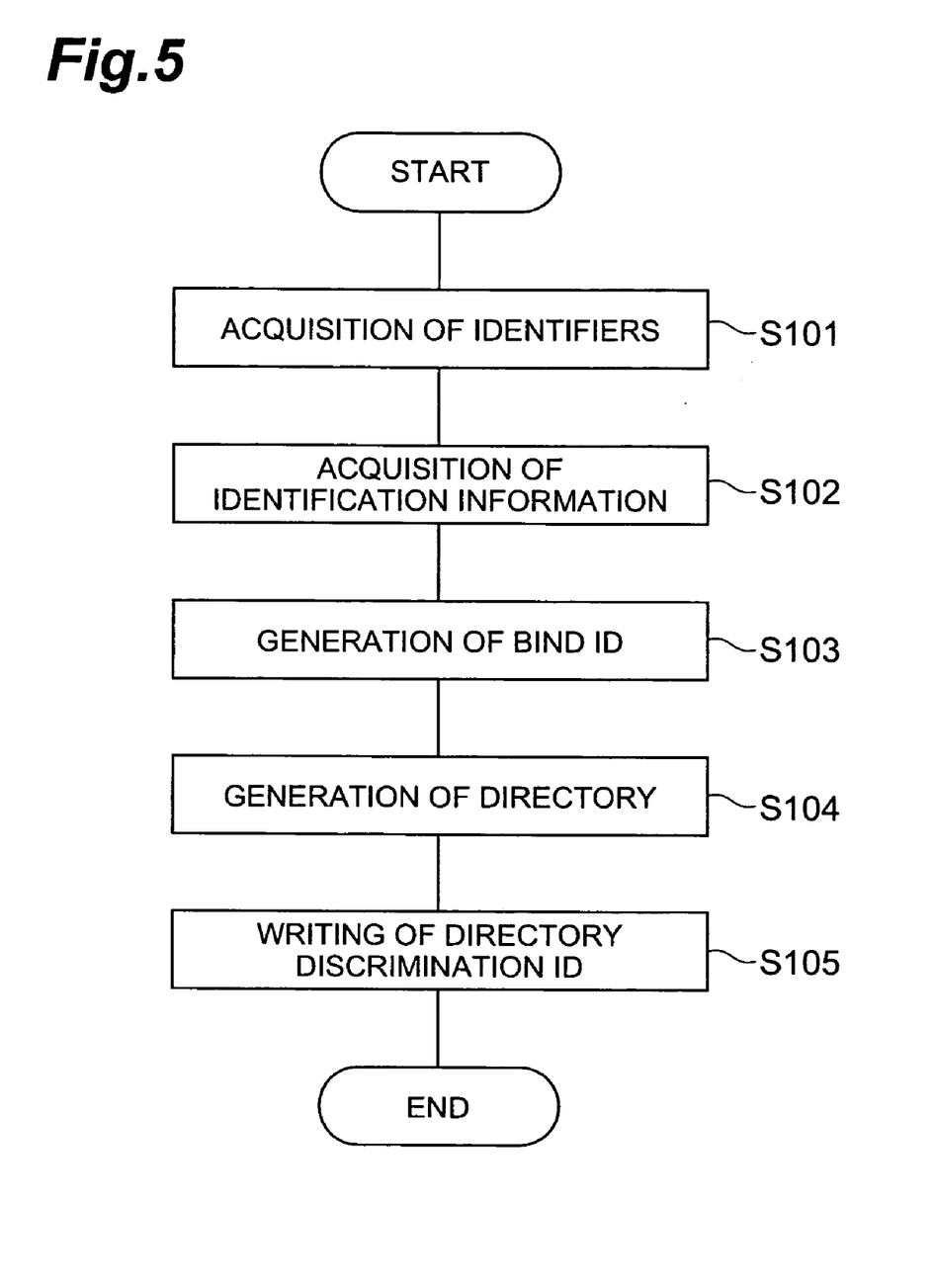
FIG. 5 is a flowchart to illustrate an operation of external memory function module 15 in FIG. 1.

Subsequently, the operation (external memory management method) carried out by the external memory function module 15 of the present embodiment as described above will be described in detail with reference to the flowcharts of FIG. 5 and FIG. 6. FIG. 5 is a flowchart for explaining the operation of the external memory function module 15 in a situation in which the directory 20A is reserved as a storage area for the application 101A.

In FIG. 5, first, the application 101A designates the AP-ID, CP-ID, model ID, series ID, and UIM-ID as the application identifier and the wireless communication terminal identifier, and then the identifier acquirer 151 acquires the identifiers thus designated. Then the identifiers thus acquired are fed to the identification information acquirer 152 (step S101).

Next, the identification information acquirer 152 acquires the identification information corresponding to the identifiers acquired at step S101, from the ADF 102A, UIM 13, or management information storage 14. Specifically, the identification information acquirer 152 acquires from the ADF 102A, the digital data of "www.aplication-a.com/download.html" corresponding to the AP-ID of the application identifier and the digital data of "Corp. AAA" corresponding to the CP-ID, as the application identification information. Furthermore, the identification information acquirer 152 acquires from the UIM 13 or from the management information storage 14, the digital data of "MOBILE101" corresponding to the model ID of the wireless communication terminal identifier, the digital data of "1234" corresponding to the series ID, and the digital data of "UIM-MOBILE101-1234" corresponding to the UIM-ID, as the wireless communication terminal identification information. Then the acquirer 152 feeds the application identification information and the wireless communication terminal identification information acquired in this manner, to the generator 153 (step S102).

The generator 153 generates the bind ID to specify the application 101A and the cell phone 1, based on the identification information acquired at step S102, using the predetermined hash function. On this occasion, the identification information fed to the generator 153 at step S102 is used as arguments in the hash function, and a hash value calculated is defined as the bind ID. Then the bind ID generated in this manner is fed to the writing section 155 (step S103).

Next, the reserving section 154 reserves the directory 20A in the external memory 2 not allocated yet to another application, as a storage area available for the application 101A (step S104).

Next, the writing section 155 writes the bind ID generated at step S103, as a discrimination ID of the directory 20A reserved at step S104, in the attribute file 21 of the external memory 2 (step S105). This associates the directory 20A with only the application 101A. Furthermore, since the bind ID is not generated by the application 101A but generated by the generator 153, it is feasible, for example, to prevent another application not sharing data with the application 101A, from falsifying and assuming this bind ID without permission.

Figure 6:
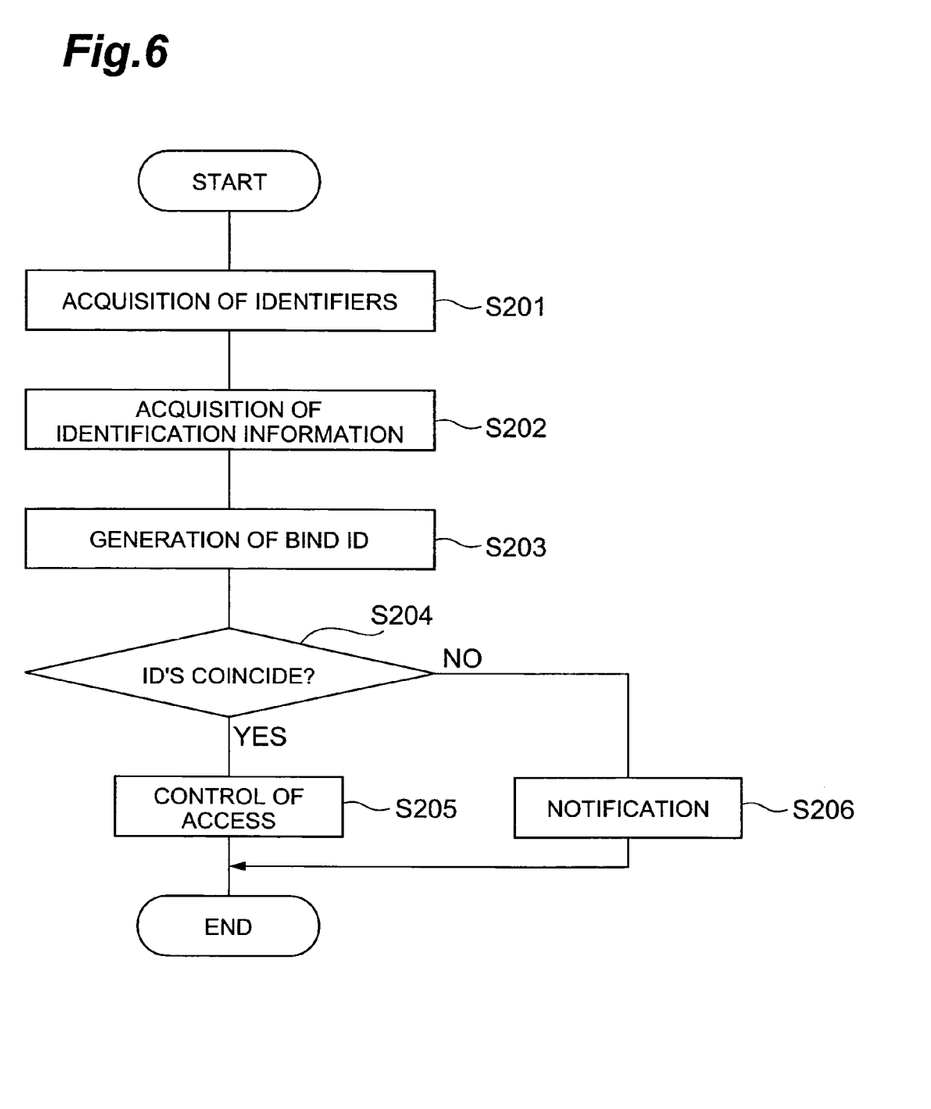
FIG. 6 is a flowchart to illustrate an operation of external memory function module 15 in FIG. 1.

FIG. 6 is a flowchart for explaining the operation of the external memory function module 15 in the case where the application 101A is allowed to access the directory 20A.

In FIG. 6, first, the application 101A designates the AP-ID, CP-ID, model ID, series ID, and UIM-ID as the application identifier and the wireless communication terminal identifier, and then the identifier acquirer 151 acquires the identifiers thus designated. Then the identifiers thus acquired are fed to the identification information acquirer 152 (step S201).

Next, the identification information acquirer 152 acquires the identification information corresponding to the identifiers acquired at step S201, from the ADF 102A, UIM 13, or management information storage 14. Specifically, the identification information acquirer 152 acquires from the ADF 102A, the digital data of "www.aplication-a.com/download.html" corresponding to the AP-ID of the application identifier and the digital data of "Corp. AAA" corresponding to the CP-ID, as the application identification information. Furthermore, the identification information acquirer 152 acquires from the UIM 13 or from the management information storage 14, the digital data of "MOBILE101" corresponding to the model ID of the wireless communication terminal identifier, the digital data of "1234" corresponding to the series ID, and the digital data of "UIM-MOBILE101-1234" corresponding to the UIM-ID, as the wireless communication terminal identification information. Then the acquirer 152 feeds the application identification information and the wireless communication terminal identification information acquired in this manner, to the generator 153 (step S202).

The generator 153 generates the bind ID to specify the application 101A and the cell phone 1, on the basis of the identification information acquired at step S202, using the predetermined hash function. On this occasion, the identification information fed to the generator 153 at step S202 is used as arguments in the hash function, and a hash value calculated is defined as the bind ID. Then the bind ID generated in this manner is fed to the controller 156 (step S203).

Next, the directory discrimination ID recorded in the attribute file 21 of the external memory 2 is checked against the bind ID peculiar to the application 101A (step S204), which was generated at step S203. The directory discrimination ID recorded in the attribute file 21 refers to the directory discrimination ID written in the attribute file 21 at the aforementioned steps S101-S105. When the result of the check at step S204 is that the directory discrimination ID coincides with the bind ID, the controller 156 performs such control as to permit access of the application 101A to the directory 20A (step S205). This permits the application 101A to access and decrypt the data stored in the directory 20A.

On the other hand, when the result of the check at step S204 is that the directory discrimination ID does not coincide with the bind ID, the controller 156 performs such control as to inhibit access of the application 101A to the directory 20A. Then the notifier 157 notifies the application 101A of notification information to indicate the inhibition of access of the application 101A to the directory 20A (step S206).

Figure 7:
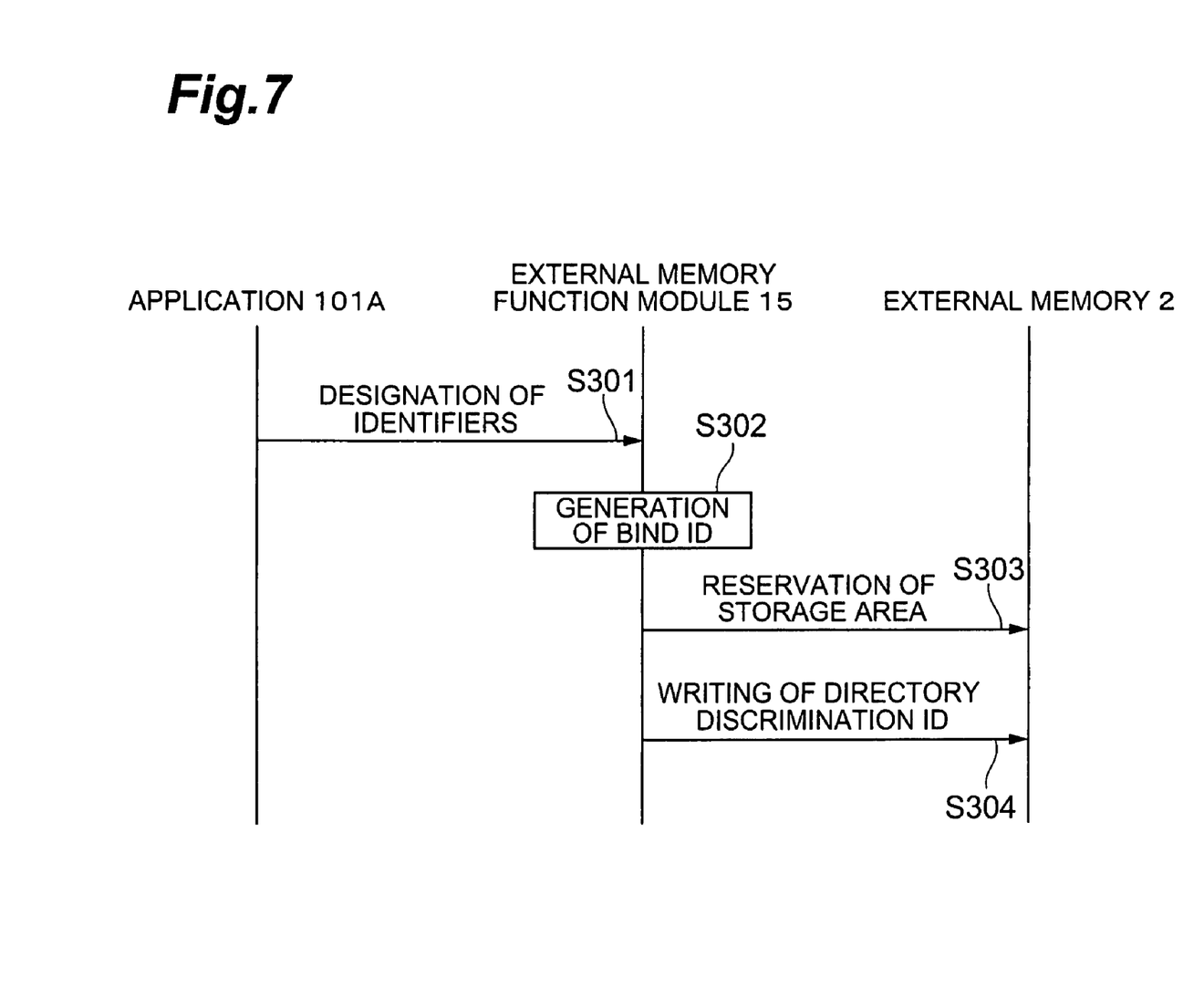
FIG. 7 is a sequence diagram to illustrate an operation of external memory function module 15 in FIG. 1.

Subsequently, the action and effect of the present embodiment will be described with reference to FIGS. 7 and 8. FIG. 7 is a sequence diagram for explaining the operation of the external memory function module 15, for example, in a situation in which the directory 20A is reserved as a storage area for the application 101A. As shown in FIG. 7, only the identifier, i.e., only the type of relevant identification information is acquired from the application 101A downloaded in the cell phone 1 (step S301). Then the external memory function module 15 generates the bind ID, based on the identification information designated by this identifier (step S302). Since the bind ID as the specific information peculiar to the application 101A and the cell phone 1 is not generated by the application 101A side but generated by the external memory function module 15 side of the present embodiment as described above, it is feasible, for example, to prevent another application not sharing data with the application 101A, from falsifying and assuming this bind ID without permission.

The external memory function module 15 reserves the directory 20A for the application 101A in the external memory 2 (step S303) and writes the bind ID as a discrimination ID for the directory 20A in the attribute file 21 (step S304). Therefore, it becomes feasible to write the information restricted to the application 101A only, in the attribute file 21, and thus the use of the directory 20A with the attribute file 21 can be limited to the application 101A only.

Figure 8:
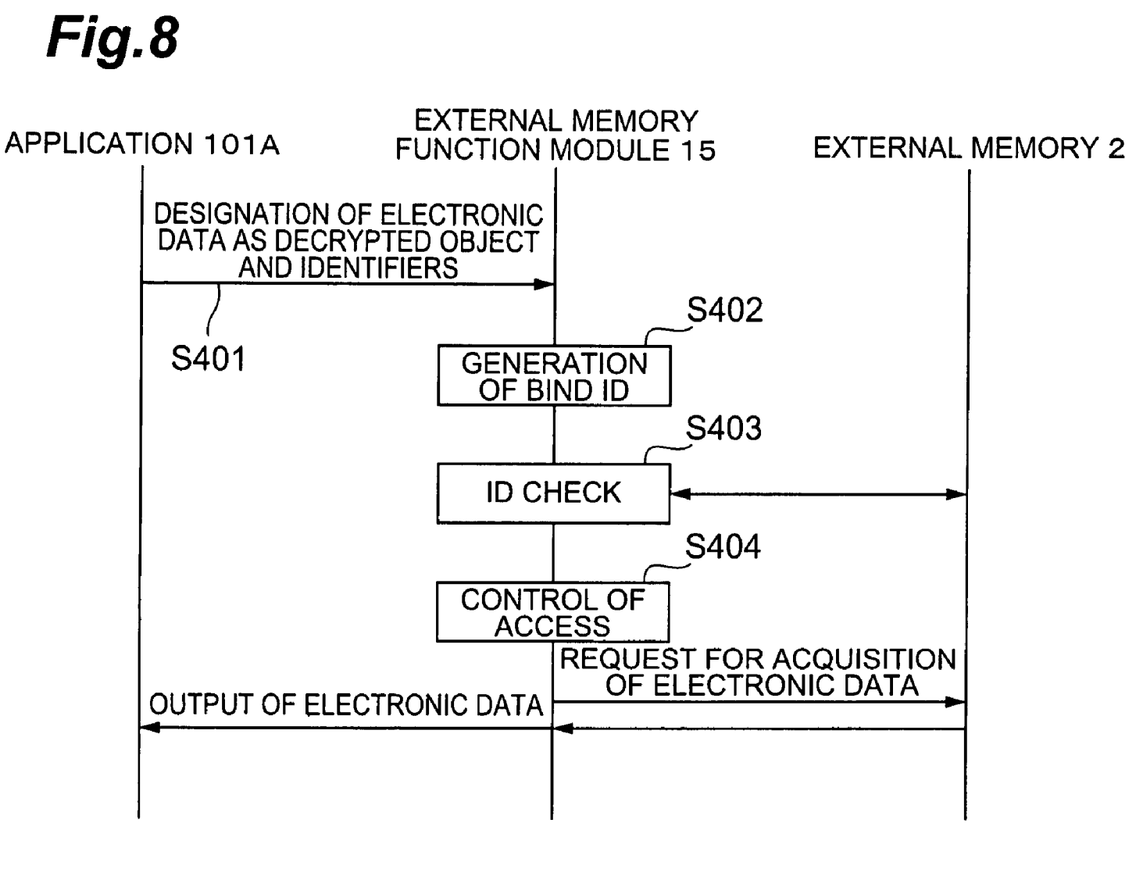
FIG. 8 is a sequence diagram to illustrate an operation of external memory function module 15 in FIG. 1.

FIG. 8 is a sequence diagram for explaining the operation of the external memory function module 15, for example, in a situation in which the application 101A is allowed to access the directory 20A. As shown in FIG. 8, the application 101A designates electronic data as an object for decryption and an identifier for generation of the bind ID (step S401), and then the external memory function module 15 checks the directory discrimination ID recorded in the attribute file 21 of the external memory 2, against the bind ID generated by the external memory function module 15 itself on the basis of the identifier designated at step S401 (step S402 and step S403). The directory discrimination ID preliminarily contains a record of information to specify the application permitted to access the directory 20A with the directory discrimination ID. For this reason, the external memory function module 15 is able to perform such control as to permit the application 101A to access only the directory with the directory discrimination ID coinciding with the bind ID (step S404). The control on this occasion is carried out, for example, in such a manner that the external memory function module 15 extracts the electronic data under the request for decryption from the directory 20A and transfers it to the application 101A. Therefore, it is feasible to prevent a downloaded application from extracting data in the external memory 2 unrelated to the application and from becoming able to decrypt the data.

The present embodiment uses the application identification information such as the AP-ID and CP-ID, and the wireless communication terminal identification information such as the model ID, series ID, and UIM-ID, as the identification information being a basis for generation of the bind ID. For this reason, the external memory function module 15 becomes able to write the bind ID limited to the application and cell phone 1 only, in the attribute file 21 in the external memory 2. Therefore, the use of the directory specified by the directory discrimination ID can be limited to the application and the cell phone only.

The preferred embodiment of the present invention was described above, but it is needless to mention that the present invention is by no means limited to the above embodiment.

For example, the present embodiment used the cell phone 1 as a wireless communication terminal, but, without having to be limited to it, the present invention can also be readily applied to so-called portable terminals such as PDA (Personal Digital Assistance).

The present embodiment was provided with one attribute file 21 corresponding to the whole of the external memory 2, but it is also possible to provide separate attribute files for a large number of respective directories in the external memory 2.

The directory discrimination ID may also be configured to further contain a memory address or the like on the external memory 2 for each directory reserved by the reserving section 154, in addition to the information contained in the bind ID.

What is claimed is:

1. An external memory management apparatus for controlling access of an application downloaded in a wireless communication terminal, to a removable external memory, comprising:

acquiring means for acquiring a first identifier for said application downloaded and acquiring a second identifier for the wireless communication terminal;

generating means for generating a third identifier, which specifies the application and the wireless communication terminal, based on receiving inputs of the first identifier acquired by the acquiring means and the second identifier acquired by the acquiring means;

reserving means for reserving a predetermined area of the external memory as a storage area available for the application; and writing means for writing the third identifier generated by the generating means, in attribute information of the storage area reserved by the reserving means.

2. The external memory management apparatus according to claim 1, further comprising:

disabling means for disabling access of an application requesting access to the reserved predetermined area of the removable external memory when the third identifier does not correspond to the application requesting access.

3. The external memory management apparatus according to claim 1, wherein the generating means generates the third identifier by inputting the first identifier and the second identifier into a hash function generation algorithm.

4. A method implemented by an external memory management apparatus configured to control access of an application downloaded in a wireless communication terminal to a removable external memory, comprising:

acquiring, in the external memory management apparatus, a first identifier for said application downloaded and a second identifier for the wireless communication terminal;

generating, in the external memory management apparatus, a third identifier, which specifies the application and the wireless communication terminal, based on receiving inputs of the first identifier and the second identifier;

reserving, with the external memory management apparatus, a predetermined area of the external memory as a storage area available for the application; and writing, with the external memory management apparatus, the third identifier generated in the generating, in attribute information of the storage area reserved in the reserving.

5. The external memory management method according to claim 4, further comprising:

inhibiting access of an application requesting access to the reserved predetermined area of the removable external memory when the third identifier does not correspond to the application requesting access.

6. The external memory management method according to claim 4, wherein the third identifier is generated by inputting the first identifier and the second identifier into a hash function generation algorithm.

7. A computer-readable storage medium encoded with instructions, which when executed by an external memory management apparatus configured to control access of an application downloaded in a wireless communication terminal to a removable external memory, causes the external memory management apparatus to implement a method comprising:

acquiring, in the external memory management apparatus, a first identifier for said application downloaded and a second identifier for the wireless communication terminal;

generating, in the external memory management apparatus, a third identifier, which specifies the application and the wireless communication terminal, based on receiving inputs of the first identifier and the second identifier;

reserving, with the external memory management apparatus, a predetermined area of the external memory as a storage area available for the application; and writing, with the external memory management apparatus, the third identifier generated in the generating, in attribute information of the storage area reserved in the reserving.

8. The computer-readable storage medium according to claim 7, the method further comprising:
inhibiting access of an application requesting access to the reserved predetermined area of the removable external memory when the third identifier does not correspond to the application requesting access.

9. The computer-readable storage medium according to claim 7,
wherein the generating the third identifier is generated by inputting the first identifier and the second identifier into a hash function generation algorithm.

10. An external memory management apparatus integrated in a wireless communication terminal for controlling access of an application downloaded in the wireless communication terminal, to a removable external memory, comprising:
acquiring means for acquiring a first identifier for said application downloaded and acquiring a second identifier for the wireless communication terminal;
generating means for generating a third identifier, which specifies the application and the wireless communication terminal, based on receiving inputs of the first identifier acquired by the acquiring means and the second identifier acquired by the acquiring means;
reserving means for reserving a predetermined area of the external memory as a storage area available for the application; and
writing means for writing the third identifier generated by the generating means, in attribute information of the storage area reserved by the reserving means.

11. The external memory management apparatus integrated in the wireless communication terminal according to claim 10,
wherein the acquiring means acquires, from the application, type of application identification information to identify the application, and type of wireless communication terminal identification information to identify the wireless communication terminal, and
wherein the generating means generates specific information to specify the application and the wireless communication terminal, based on the contents of the application identification information designated by the type of application identification information and based on the contents of the wireless communication terminal identification information designed by the type of wireless communication terminal identification information.

12. A method implemented by an external memory management apparatus integrated in a wireless communication terminal configured to control access of an application downloaded in the wireless communication terminal to a removable external memory, comprising:
acquiring, at the external memory management apparatus, a first identifier for said application downloaded and acquiring a second identifier for the wireless communication terminal;
generating, at the external memory management apparatus, a third identifier, which specifies the application and the wireless communication terminal, based on receiving inputs of the first identifier and the second identifier;
reserving, at the external memory management apparatus, a predetermined area of the external memory as a storage area available for the application; and
writing, at the external memory management apparatus, the third identifier generated in the generating, in attribute information of the storage area reserved in the reserving.

* * * * *